US012292094B2

(12) United States Patent
Brand et al.

(10) Patent No.: US 12,292,094 B2
(45) Date of Patent: May 6, 2025

(54) DAMPING ARRANGEMENT FOR A CABLE

(71) Applicant: DYWIDAG—Systems International GmbH, Munich (DE)

(72) Inventors: Werner Brand, Freising (DE); Arnaud Pacitti, Leipzig (DE)

(73) Assignee: DYWIDAG—Systems International GmbH, Unterschleissheim (DE)

( * ) Notice: Subject to any disclaimer, the term of this patent is extended or adjusted under 35 U.S.C. 154(b) by 188 days.

(21) Appl. No.: 17/918,458

(22) PCT Filed: May 27, 2020

(86) PCT No.: PCT/EP2020/064671
§ 371 (c)(1),
(2) Date: Oct. 12, 2022

(87) PCT Pub. No.: WO2021/239221
PCT Pub. Date: Dec. 2, 2021

(65) Prior Publication Data
US 2023/0148435 A1    May 11, 2023

(51) Int. Cl.
*E01D 19/16* (2006.01)
*F16F 15/02* (2006.01)
(Continued)

(52) U.S. Cl.
CPC ............ *F16F 15/022* (2013.01); *E01D 19/16* (2013.01); *E04B 1/98* (2013.01); *E04H 9/0235* (2020.05); *F16F 2230/0005* (2013.01)

(58) Field of Classification Search
CPC ............ F16F 15/022; F16F 2230/0005; E04H 9/0235; E01D 19/16; E01D 19/06; E04B 1/98
(Continued)

(56) References Cited

U.S. PATENT DOCUMENTS 2,057,328 A * 10/1936 Cordova ................. E01D 19/16
52/148
4,261,441 A * 4/1981 Wood ........................ F16F 7/08
188/381
(Continued)

FOREIGN PATENT DOCUMENTS

EP    1 512 794    3/2005

OTHER PUBLICATIONS

International Search Report and Written Opinion of PCT/EP2020/064671 dated Jan. 27, 2021, 8 pages.

*Primary Examiner* — Nkeisha Smith
(74) *Attorney, Agent, or Firm* — Rankin, Hill & Clark LLP

(57) ABSTRACT

The invention relates to a damping arrangement (100) for a cable (102) extending in a tensioned manner from an anchorage (108), said damping arrangement (100) comprising a rigid damping action transfer device (112) which is positively connected to the cable (102) at a predetermined distance (L1) from said anchorage (108), and at least one damping device (110) extending in a damping manner between said damping action transfer device (112) and a constructional element (106) rigidly connected to said anchorage (108), and connected to said damping action transfer device (112) at a further predetermined distance (L2) from said anchorage (108), said further predetermined distance (L2) being shorter than said predetermined distance (L1).

18 Claims, 5 Drawing Sheets

(51) Int. Cl.
*E04B 1/98* (2006.01)
*E04H 9/02* (2006.01)

(58) Field of Classification Search
USPC .......................................................... 248/636
See application file for complete search history.

(56) References Cited

U.S. PATENT DOCUMENTS

| | | | | |
|---|---|---|---|---|
| 4,995,583 | A * | 2/1991 | De La Fuente | F16F 9/30 |
| | | | | 248/74.4 |
| 7,631,384 | B2 * | 12/2009 | Lecinq | E01D 11/04 |
| | | | | 14/11 |
| 7,950,093 | B2 * | 5/2011 | Brand | E04C 5/10 |
| | | | | 14/22 |
| 8,052,408 | B2 * | 11/2011 | Kang | E01D 19/16 |
| | | | | 425/111 |
| 8,215,607 | B2 * | 7/2012 | Wang | F16F 7/1022 |
| | | | | 248/592 |
| 8,627,614 | B2 * | 1/2014 | Pereira | E04H 12/20 |
| | | | | 52/146 |
| 9,551,120 | B2 * | 1/2017 | Annan | E01D 19/16 |
| 9,617,697 | B2 | 4/2017 | Stubler et al. | |
| 10,081,921 | B2 * | 9/2018 | Mellier | F16F 9/54 |
| 10,738,423 | B1 * | 8/2020 | Apostolopoulos | E01D 19/106 |
| 11,286,629 | B2 * | 3/2022 | Annan | E04H 12/20 |
| 2016/0319499 | A1 | 11/2016 | Annan | |

* cited by examiner

DAMPING ARRANGEMENT FOR A CABLE

The invention relates to structure comprising an anchorage, a cable extending in a tensioned manner from the anchorage, and a damping arrangement, said damping arrangement comprising at least one damping device.

Such damping devices may, for example, be used for cables for suspending and/or supporting structural units of super-ordinate structures, e.g. buildings, towers, bridges, and the like.

Damping devices for reducing vibrations in cables, e.g. stay cables of cable-stayed bridges, are particularly effective if they are installed as far away as possible from the anchorage of the cable. For example, the damping device may be connected to the cable at a predetermined distance amounting to about 4% of the overall length of the cable. Taking into account that the overall length of the cable may amount to several hundred meters, this will result in the connection point of the damper to the cable being located several meters above the superstructure supported by the cable, e.g. the driving deck of the cable-stayed bridge. As a consequence, the damping devices either have to be very long or they have to be mounted far above the superstructure using an expensive framework, which in addition may reduce the effectiveness of the damping device due to its inherent elastic deformability. Furthermore, such frameworks have considerable aesthetic drawbacks.

Damping arrangement of the afore-mentioned type are well-known to those skilled in the art. In particular, reference is made to U.S. Pat. No. 10,081,921 B2.

Furthermore, it is referred to U.S. Pat. No. 9,617,697 B2, US 2016/0319499 A1, and EP 1 512 794 B1.

In view of the above, it is an object of the present invention to provide an improvement to damping arrangements of the afore-mentioned type.

According to the invention, this object is achieved by a structure comprising an anchorage, a cable extending in a tensioned manner from the anchorage, and a damping arrangement, said damping arrangement comprising a rigid damping action transfer device which is positively connected to the cable at a predetermined distance from said anchorage, and at least one damping device extending in a damping manner between said damping action transfer device and a constructional element rigidly connected to said anchorage, and connected to said damping action transfer device at a further predetermined distance from said anchorage, said further predetermined distance being shorter than said predetermined distance.

According to the invention, the effective connection point, which is relevant for the technical design of the damping arrangement, can still be located far away from the anchorage, namely at the predetermined distance, while the damping device itself is not directly attached to the cable but to the damping action transfer device at a position between the connection point thereof to the cable and the anchorage, namely at the further predetermined distance. Accordingly, the damping device may have a shorter length, and no framework is required. The lack of necessity of providing a framework results in considerably lower costs and an improved aesthetic appearance. Furthermore, the maintenance and/or inspection of the damping device are/is easier due to its better accessibility.

In the case of a stay cable, the damping device can also be mounted steeper, i.e. not orthogonal to the cable. It can thus be made even shorter. In addition, an overlap of the base point attachment of the damping device with the neighboring cable can be avoided.

A further cost reduction may be achieved, if an element already being a part of the damping arrangement's design assumes the function of the damping action transfer device. For example, said rigid damping action transfer device may be formed by a rigid transition pipe surrounding the cable adjacent to the anchorage. Such transition pipes are usually surrounding the cable close to the anchorage as a further protection against external influences.

For effectively transmitting the damping forces between the cable and the damping action transfer device a force transmitting device may be located between the cable and the damping action transfer device for positively connecting the cable to the damping action transfer device. Although any elastically deformable connection between the cable and the damping action transfer device could reduce the effectiveness of the damping device, it turned out that, according to a simple and cost-effective design, the force transmitting device may include a resilient element adapted and configured to be compressed between two compression plates so as to be expanded in a direction orthogonal to the plate planes of the compression plates, as a resilient element compressed in the afore-described manner shows a sufficient rigidity. The resilient element may, for example, be constituted by a rubber element.

Said resilient element may, for example, have an annular shape and/or may be arranged to surround the cable. In this case, the radially inner expanded portion of the resilient element may positively abut against the cable or an element connected thereto, while the radially outer expanded portion of the resilient element may positively abut against the damping action transfer device.

For increasing the effectiveness of the positive connection between the cable and the damping action transfer device, it is further suggested that the force transmitting device engages a compacting clamp unit adapted and intended for compacting a plurality of wires and/or strands of said cable to a side-by-side arrangement. By this compacting clamp any, in particular radial, movements of the wires and/or strands of said cable relative to each other may be excluded, thus eliminating any elastic deformability jeopardizing the effectiveness of the force transfer.

In order to ensure that the damping device is able to effectively dampen the cable's vibrations, the damping action transfer device must be able to freely follow the cable's movements. This may, for example be achieved by pivotably supporting the damping action transfer device at its anchorage end. In case the damping action transfer device is formed by the transition pipe, this may be realized by a resilient ring arranged between the axial end surface of the anchorage end of the transition pipe and a corresponding support surface of the anchorage.

Furthermore, the anchorage end of the transition pipe may be in sliding contact with at least one socket element allowing a pivoting movement of the transition pipe around its anchorage end. To this end, the at least one socket element may have a convex surface pointing towards the outer surface of the transition pipe.

According to a further embodiment, an angle formed between the at least one damping device and the cable may amount to less than 90°. In this way, the damping device may be arranged steeper than with conventional damping arrangements and thus be shorter.

If the damping device were to be connected directly to the cable as in the prior art, an angle different from 90° would cause a longitudinal force on the polyethylene sheath of the strands of the cable, which in turn would lead to a displacement of the compaction clamp. Therefore, in the prior art the damping device is always arranged orthogonal to the cable. Only because of the connection of the damping device with the damping action transfer device according to the invention, it is possible to arrange the damping device steeper and therefore shorter, since the damping action transfer device dissipates the longitudinal force via the anchorage.

In order to increase the damping effect, a plurality of damping devices may be connected to the rigid damping action transfer device.

Furthermore, the damping devices do not necessarily have to be connected at one and the same further predetermined distance. Rather, at least two damping devices are connected at different further predetermined distances to the rigid damping action transfer device.

This allows further specific configurations to be realized. For example, at least two damping devices, when seen along the cable's longitudinal direction, may be crossing each other between their respective two ends, i.e. extend in analogy to skew lines. In particular, this configuration allows a more effective dampening of lateral vibrations of the cable, i.e. vibrations in a direction orthogonal to both the longitudinal direction of the cable and the vertical direction.

According to a further embodiment of the invention, at least one damping device may be formed as one of a passive fluidic damper, a semi-active fluidic damper, a friction damper and an elastomer damper.

It should be noted that merely the at least one damping device, the rigid damping action transfer device, and optionally the force transmitting device, constitute elements of the damping arrangement according to the invention, while the cable, the anchorage and the constructional element rigidly connected to said anchorage do not constitute elements of the damping arrangement according to the invention. However, the damping arrangement according to the invention may be used in combination with such cable, anchorage and constructional element.

In the following, the present invention will be explained in more detail referring to specific embodiments shown in the attached drawing, in which FIG. 1 shows a partially sectional view of a stay cable equipped with a first embodiment of a damping arrangement according to the present invention;

Figure 1:
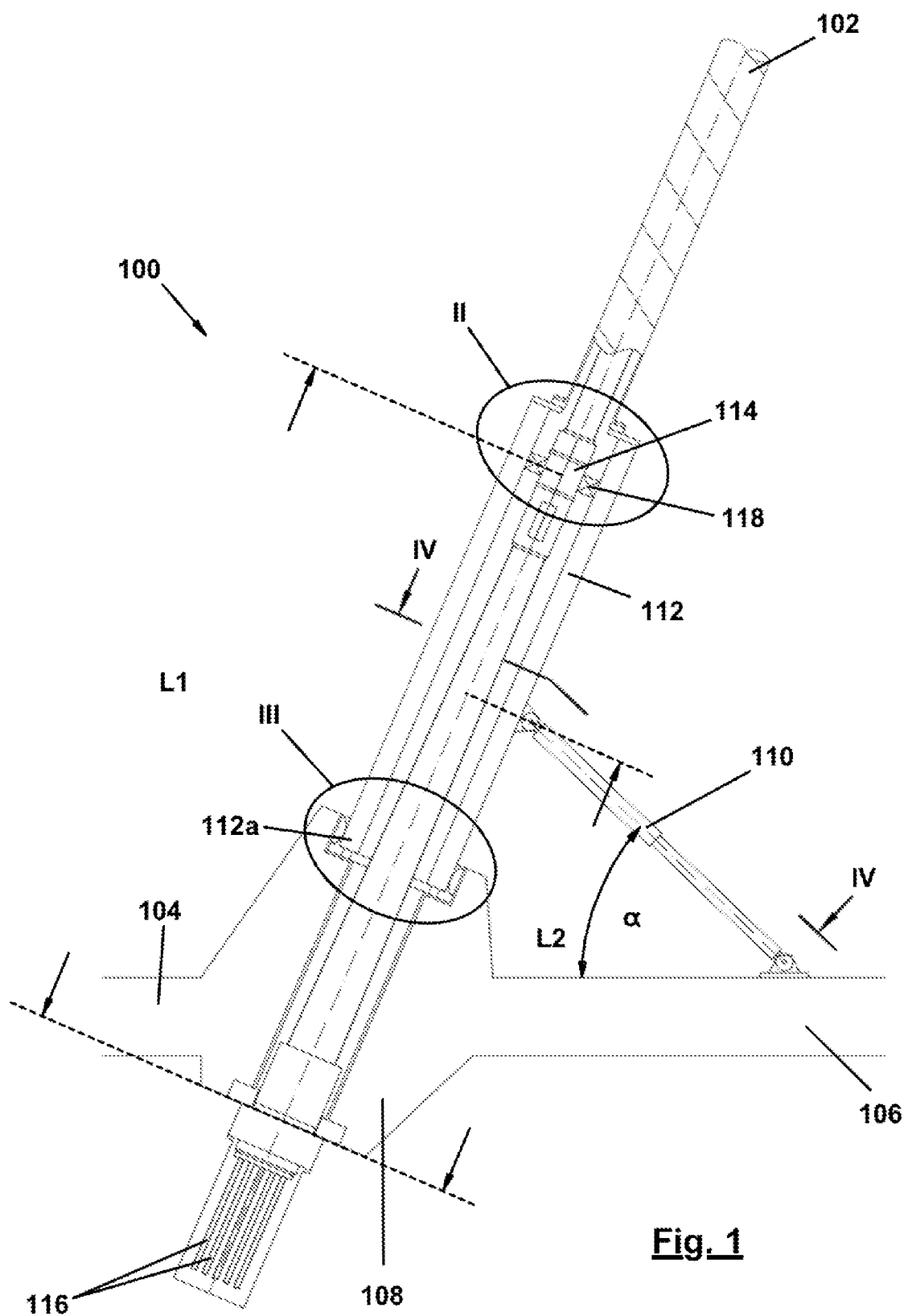

FIG. 1 shows a damping arrangement 100 which is applied to a stay cable 102 of a cable-stayed bridge 104 which is schematically represented by its driving and/or walking deck 106 and the anchorage 108 for the stay cable 102. The stay cable 102 extends in a tensioned manner from the anchorage 108 to a corresponding anchorage (not shown) of a pylon (not shown) of the cable-stayed bridge 104 so as to contribute to supporting the driving deck 106.

The damping arrangement 100 comprises a damping device 110 and a rigid transition pipe 112 surrounding the cable 102.

At a predetermined distance L1 from the anchorage 108, the rigid transition pipe 112 is positively connected to the outer surface of the cable 102, or to the outer surface of a compacting clamp 114 compacting a plurality of wires and/or strands 116 of the cable 102 to a side-by-side arrangement, to be precise, via a force transmitting device 118.

Figure 2:
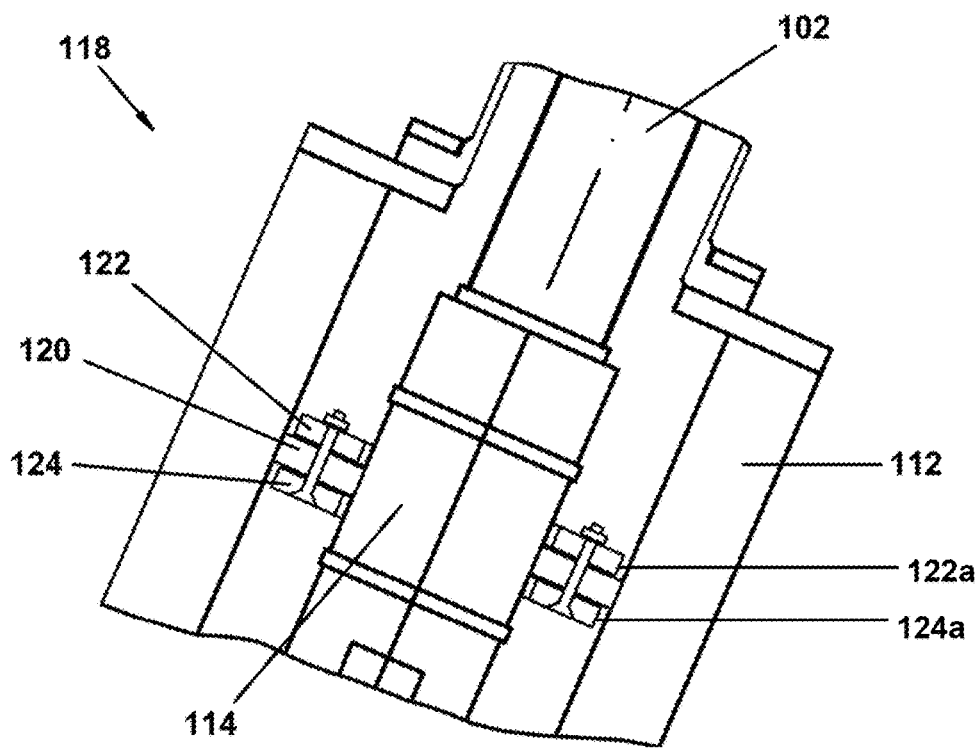
FIG. 2 shows an enlarged view of detail II in FIG. 1.

As may be seen in more detail from FIG. 2, the force transmitting device 118 may include a resilient element 120 which is compressed between two compression plates 122, 124 so as to be expanded in a direction orthogonal to the plate planes 122a, 124a of the compression plates 122, 124. In this way, the radially inner expanded portion of the resilient element 120 may positively abut against the cable 102 or the compacting clamp 114 connected thereto, while the radially outer expanded portion of the resilient element 120 may positively abut against the inner surface of the transition pipe 112. The resilient element 120 may, for example, have an annular shape and may be arranged to surround the cable 102.

In this way, any vibrational movement of the cable 102 is transmitted to the transition pipe 112.

Figure 3:
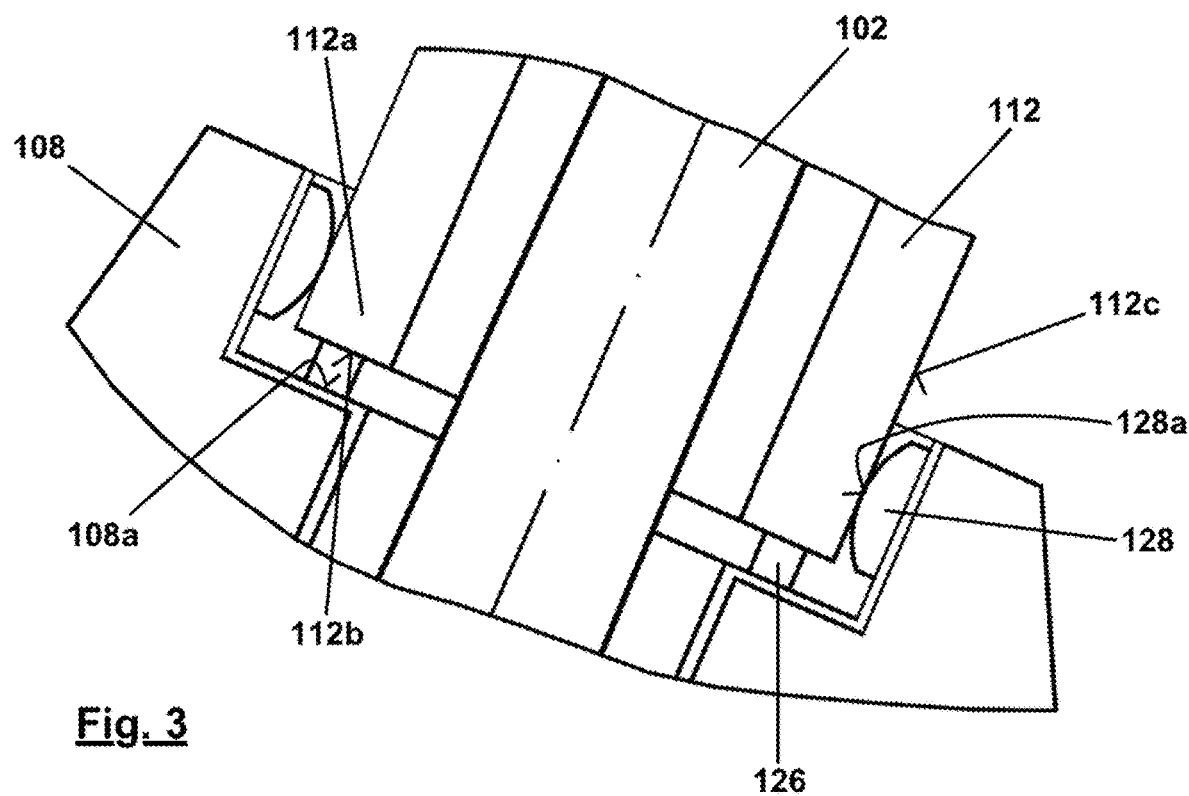
FIG. 3 shows an enlarged view of detail III in FIG. 1.

In order to allow the transition pipe 112 to freely follow vibrational movements of the cable 102, it is pivotably supported at its anchorage end 112a. For this purpose, as may be seen from FIG. 3, the axial end surface 112b of the transition pipe 112 is supported by a resilient ring 126 arranged between the axial end surface 112b of the transition pipe 112 and a corresponding support surface 108a of the anchorage 108. Furthermore, an outer surface 112c of the transition pipe 112 is slidingly guided in a socket ring 128 having a convex surface 128a slidingly abutting against the outer surface 112c of the transition pipe 112.

Due to the afore-described design, any vibrational movement of the cable 102 is transferred to a pivoting movement of the transition pipe 112 around its anchorage end 112a.

In order to dampen the vibrational movement of the cable 102, i.e. the pivoting movement of the transition pipe 112, the damping device 110 is connected to the transition pipe 112 at a second predetermined distance L2 from the anchorage 108, which is shorter than the first predetermined distance L1. As a consequence, the effective connection point, which is relevant for the technical design of the damping arrangement 100, may be located far away from the anchorage 108, namely at the first predetermined distance L1, while the damping device 110 needs not to be directly attached to the cable 102, but may be attached to the transition pipe 112 at a position closer to the anchorage 108, namely at the second predetermined distance L2. As may be easily understood, due to its rigidity, the transition pipe 112 thus fulfills the function of a damping action transfer device.

As may be seen from FIG. 1, the damping device 110, on the one side, and the cable 102 or the transition pipe 112, respectively, on the other side, form an angle $\alpha$ between them, which amounts to less than 90°. In this way, the damping device 110 can be arranged steeper than with conventional damper arrangements and thus be shorter.

As far as the damping device is concerned, several alternative embodiments are conceivable.

Figure 4:
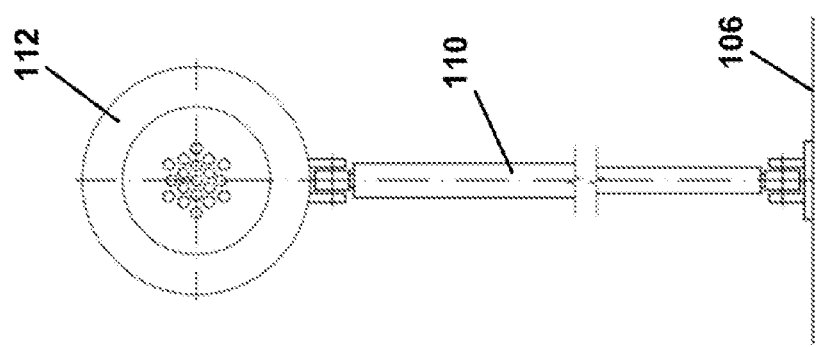
FIG. 4 shows a partially sectional view taken according to line IV-IV in FIG. 1 of a damping arrangement having one damping device.

According to a first alternative embodiment shown in FIG. 4, one single damping device 110 may extend between the driving deck 106 and the transition pipe 112.

Figure 5:
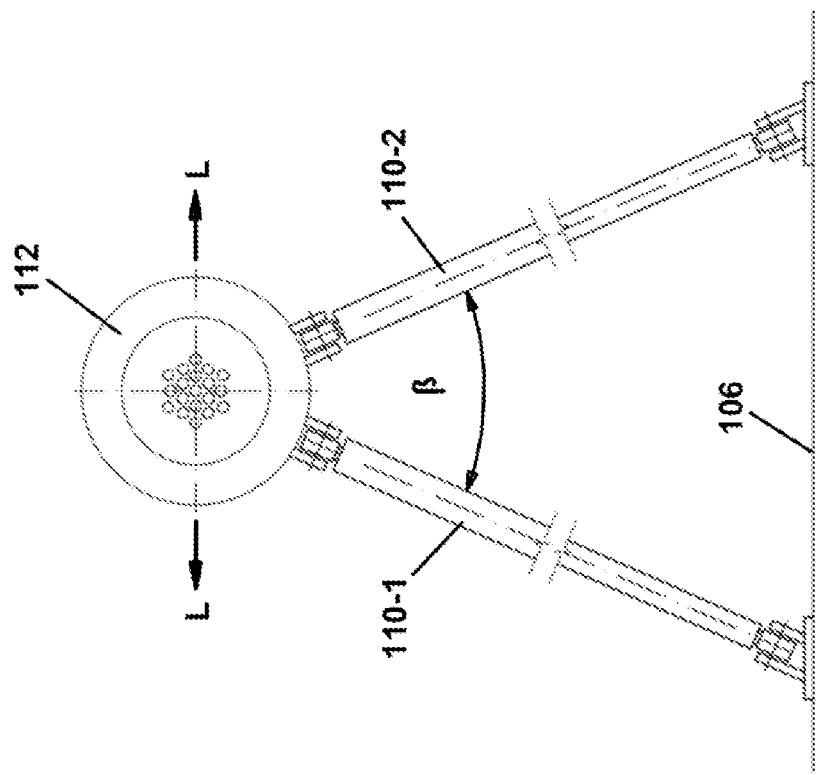
FIG. 5 shows a view similar to FIG. 4 of a damping arrangement having two damping devices, i.e. of a second embodiment of a damping arrangement.

According to a second alternative shown in FIG. 5, two damping devices 110-1, 110-2 may extend between the driving deck 106 and the transition pipe 112. The two damping devices 110-1, 110-2 may form an angle $\beta$ between them, which is different from 0°. In this way lateral movements of the transition pipe 112 indicated by arrows L may be dampened as well.

Figure 6:
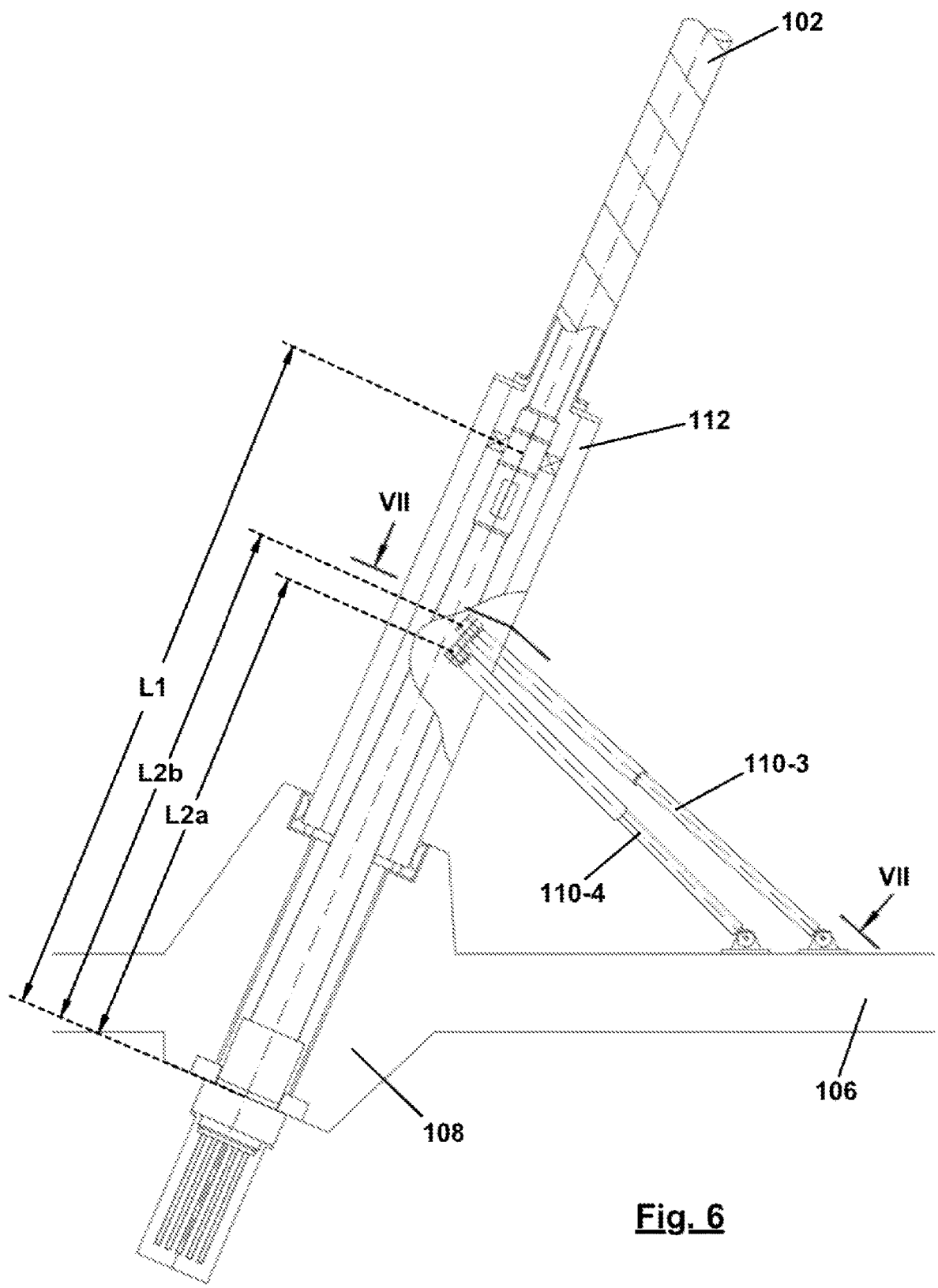
FIG. 6 shows a partially sectional view similar to FIG. 1 of a stay cable equipped with a third embodiment of a damping arrangement according to the present invention.
Figure 7:
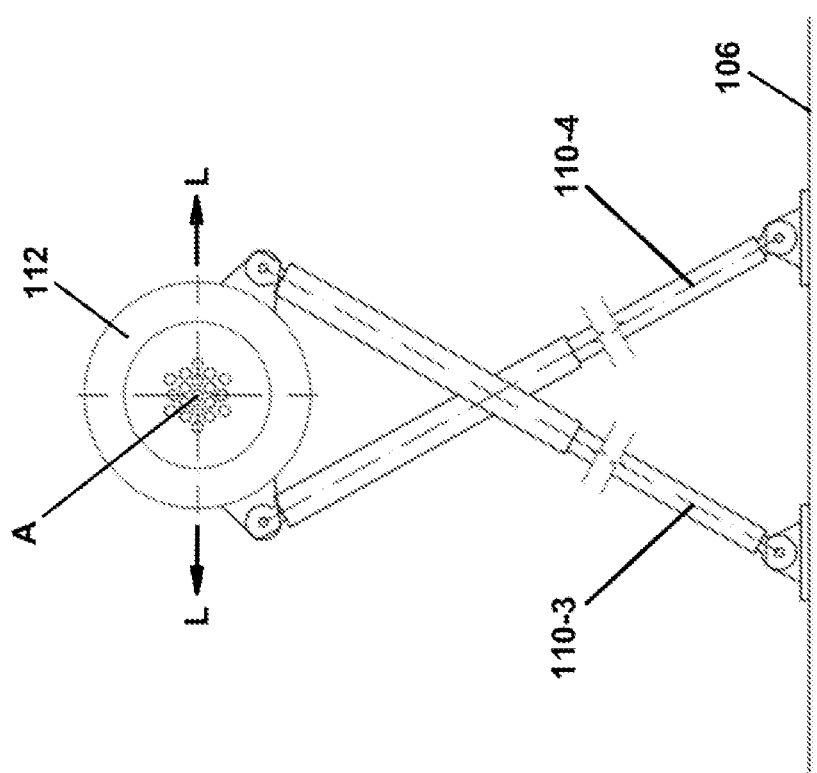
FIG. 7 shows a partially sectional view according to line VII-VII in FIG. 6 of the embodiment of FIG. 6.

While the two damping devices 110-1, 110-2 are attached to the transition pipe 112 at the same predetermined distance L2 from the anchorage, this needs not necessarily to be the case, as is shown by the third alternative of FIGS. 6 and 7 for the damping devices 110-3, 110-4. While damping device 110-3 is attached to the transition pipe 112 at a predetermined distance L2a from the anchorage 108, damping device 110-4 is attached to the transition pipe 112 at a predetermined distance L2b from the anchorage 108, still being shorter than the first predetermined distance L1.

The different distances L2a and L2b provide for a further flexibility in the design of the damping arrangement 100. For example, the two damping devices 110-3 and 110-4, when seen along the cable's longitudinal direction A, may be crossing each other between their respective two ends, i.e. extend in analogy to skew lines. This configuration allows an even more effective dampening of lateral vibrations of the cable 102.

Finally, it is to be emphasized that the invention isn't restricted to a specific type of damper. Rather, at least one damping device may be constituted by a passive fluidic damper or a semi-active fluidic damper or a friction damper or an elastomer damper.

The invention claimed is:

1. A structure comprising:
   an anchorage;
   a cable extending in a tensioned manner from the anchorage; and
   a damping arrangement, wherein said damping arrangement includes:
   a rigid damping action transfer device which is positively connected to the cable at a predetermined distance from said anchorage, and
   at least one damping device extending in a damping manner between said damping action transfer device and a constructional element rigidly connected to said anchorage, and connected to said damping action transfer device at a further predetermined distance from said anchorage,
   said further predetermined distance being shorter than said predetermined distance.

2. The structure according to claim 1,
   wherein said rigid damping action transfer device is formed by a rigid transition pipe surrounding the cable adjacent to the anchorage.

3. The structure according to claim 2,
   wherein a force transmitting device is located between the cable and the damping action transfer device for positively connecting the cable to the damping action transfer device.

4. The structure according to claim 1,
   wherein a force transmitting device is located between the cable and the damping action transfer device for positively connecting the cable to the damping action transfer device.

5. The structure according to claim 4,
   wherein the force transmitting device includes a resilient element adapted and configured to be compressed between two compression plates so as to be expanded in a direction orthogonal to plate planes of the compression plates.

6. The structure according to claim 4,
   wherein said resilient element has an annular shape and/or is arranged to surround the cable.

7. The structure according to claim 4,
   wherein said resilient element has an annular shape and/or is arranged to surround the cable.

8. The structure according to claim 4,
   wherein the force transmitting device engages a compacting clamp unit adapted and intended for compacting a plurality of wires and/or strands of said cable to a side-by-side arrangement.

9. The structure according to claim 1,
   wherein the damping action transfer device is pivotably supported at its anchorage end.

10. The structure according to claim 9,
    wherein said rigid damping action transfer device is formed by a rigid transition pipe surrounding the cable adjacent to the anchorage, and
    wherein a resilient ring is arranged between an axial end surface of the anchorage end of the transition pipe and a corresponding support surface of the anchorage.

11. The structure according to claim 10,
    wherein said rigid damping action transfer device is formed by a rigid transition pipe surrounding the cable adjacent to the anchorage, and
    wherein the anchorage end of the transition pipe is in sliding contact with at least one socket element allowing a pivoting movement of the transition pipe around its anchorage end.

12. The structure according to claim 9,
    wherein said rigid damping action transfer device is formed by a rigid transition pipe surrounding the cable adjacent to the anchorage, and
    wherein the anchorage end of the transition pipe is in sliding contact with at least one socket element allowing a pivoting movement of the transition pipe around its anchorage end.

13. The structure according to claim 12,
    wherein the at least one socket element has a convex surface pointing towards the outer surface of the transition pipe.

14. The structure according to claim 1,
    wherein an angle formed between the at least one damping device and the cable amounts to less than 90°.

15. The structure according to claim 1,
    wherein a plurality of damping devices is connected to the rigid damping action transfer device.

16. The structure according to claim 15,
    wherein at least two damping devices are connected at different further predetermined distances to the rigid damping action transfer device.

17. The structure according to claim 15,
    wherein at least two damping devices, when seen along the cable's longitudinal direction, are crossing each other between their respective two ends.

18. The structure according to claim 1,
    wherein at least one damping device is formed as one of a passive fluidic damper, a semi-active fluidic damper, a friction damper and an elastomer damper.

* * * * *